United States Patent Office 2,718,507
Patented Sept. 20, 1955

2,718,507

REACTION PRODUCT OF ORGANOPOLYSILOXANE, POLYHYDRIC ALCOHOL, DRYING OIL ACID AND PHENOL-ALDEHYDE RESIN

Lawrence A. Rauner, Midland, Mich., assignor to Dow Corning Corporation, Midland, Mich., a corporation of Michigan No Drawing. Application April 19, 1954,
Serial No. 424,269

4 Claims. (Cl. 260—19)

This invention relates to coating compositions containing organosilicon compounds, and is a continuation-in-part of applicant's copending United States patent application Serial No. 348,550, filed April 13, 1953, now abandoned.

It is the primary object of this invention to provide coating compositions having superior durability, weatherability and gloss retention. It is a further object to provide an air-drying organosilicon containing varnish which is applicable for outdoor use. Other objects and advantages accruing from this invention are detailed in or will be apparent from the following specification and appended claims.

This invention relates to a coating composition comprising (1) from 5 to 90 per cent by weight of an organosilicon compound of the formula $$R_nSiX_mO_{\frac{4-m-n}{2}}$$

where R is a monovalent hydrocarbon radical or a halogenated monovalent hydrocarbon radical, and X is selected from the group consisting of halogen atoms, alkoxy radicals and hydroxyl radicals, and $n$ has an average value of from 1 to 2 inclusive, $m$ has an average value of from .05 to 3 inclusive, and the sum of $n+m$ is not greater than 4; and (2) 5 to 90 per cent by weight of a combination of a polyhydroxy alcohol having from 3 to 4 inclusive hydroxy groups per molecule and a drying oil acid in such proportion that the ratio of the carboxyl radicals to total alcoholic hydroxyl radicals is in the range from .2:1 to 1:1; and (3) 5 to 60 per cent by weight of an oil-soluble phenol-formaldehyde resin.

The organosilicon compounds which are operative in this invention, designated as ingredient (1) in the preceding paragraph, including monomeric silanes, polymeric partial hydrolyzates of silanes, and monomeric and polymeric completely hydrolyzed silanes. The polymeric partial hydrolyzates of silanes are polysiloxanes which contain residual alkoxy groups or halogen atoms attached to silicon atoms. The completely hydrolyzed silanes are either monomeric silanols or hydroxylated polysiloxanes. These hydrolyzates and partial hydrolyzates are prepared by methods well known in the art.

For the purpose of this invention the R groups on the organosilicon compound can be any monovalent hydrocarbon radical and/or any halogenated monovalent hydrocarbon radical. The X groups on the organosilicon compond can be halogen atoms and/or any alkoxy radical and/or hydroxy radicals. The organosilicon compound can contain more than one type of R group and more than one type of X group.

Specific examples of organosilicon compounds which are operative in this invention are dimethyldichlorosilane, dibutyldiisopropoxysilane, phenylmethyldiethoxysilane, divinyldibutoxysilane, tolyltriethoxysilane, cyclohexyltrimethoxysilane, phenylmethyldibromosilane, (trifluoromethylphenyl) methylidichlorosilane, chlorophenyltriethoxysilane, bromoxenyltrichlorosilane, stearylmethyldiethoxysilane, allylstearyloxydimethoxysilane and mixtures thereof and partial and/or complete hydrolyzates of such silanes and/or mixtures of such materials. Also operative are diphenylsilanediol, phenylmethylsilanediol, dimethylsilanediol, chlorophenylmethylsilanediol, octadecylmethylsilanediol and combinations thereof. It is to be understood that the foregoing list is merely representative of the organosilicon compounds operable in this invention and is not a complete and exclusive listing.

Ingredient (2) in the compositions of the instant invention contemplates either (a) a mixture of a trihydroxy or tetrahydroxy alcohol with a drying oil acid, or (b) a drying oil, or mixtures of (a) and (b). The alcohols of mixture (a) are polyhydroxy alcohols containing either 3 or 4 hydroxyl radicals per molecule. Illustrative of these alcohols are glycerine, trimethylolethane [$CH_3C(CH_2OH)_3$], trimethylolpropane

[$CH_3CH_2C(CH_2OH)_3$]

and pentaerythritol [$C(CH_2OH)_4$]. The alcohol is combined with a drying oil acid such as linseed oil acid, sardine oil acid, soya bean oil acid, dehydrated castor oil acid, tung oil acid, oiticica oil acid, perilla oil acid, chia oil acid, hempseed oil acid, poppyseed oil acid, safflower oil acid, sunflowerseed oil acid, and walnut oil acid. The alcohol and drying oil acid are combined in amounts such that the ratio of the carboxyl radicals to total alcoholic hydroxyl radicals is in the range of from .2:1 to 1:1. When the drying oil itself is used, the ratio of carboxyl radicals to total alcoholic hydroxyl radicals is inherently 1:1. Any of the drying oils whose acid derivatives are listed above can be employed in this invention. It is to be understood that any combination of the defined alcohols, drying oil acids, and drying oils can be employed herein so long as the ratio of carboxyl radicals to total alcoholic hydroxyl radicals remains within the defined range.

The oil soluble phenol-formaldehyde resins which are ingredient (3) of this invention, are well known commercially available materials. They are soluble in organic solvents and drying oils such as those normally employed in the paint and varnish industry. The term "phenol" as employed herein includes both phenol and substituted phenols. Illustrative of the resins which are operative herein are phenol-formaldehyde resins, p-tertiarybutylphenol - formaldehyde resins, p-tertiaryamylphenol-formaldeyhde resins, and p-phenylphenol-formaldehyde resins. It should be understood that any other aliphatic or aryl substituents may be present on the phenol, provided the resulting resin is oil soluble. Both heat-reactive and nonheat-reactive phenol-formaldehyde resins are operative in this invention.

In addition to the above essential ingredients, the compositions of this invention may contain other materials which are normally added to coating compositions such as pigments, drying catalysts or additives to improve specific properties.

The method of preparation of the compositions of this invention is not critical. They can be prepared by admixing ingredients (1), (2) and (3) and heating. The alcohol and drying oil acid of ingredient (2) may be reacted together and the organosilicon compound and phenolformaldehyde resin added thereafter. Ingredients (1) and (2) may first be reacted and a drying oil and the phenol-formaldehyde resin added thereafter. Other means for combining the basic ingredients of this invention are obvious to those skilled in the art and can be employed without departing from the scope of this invention.

The preferred method for preparing the coating compositions of this invention when the organosilicon compound employed has halogen atoms, alkoxy radicals or both attached to the silicon atom, or is a partial hydrolyzate of such organosilicon compounds as above defined, is by first reacting the organosilicon compound with the polyhydroxy alcohol. When this method is employed it is preferred that the relative proportions of organosilicon compound and alcohol are such that the ratio of total halogen atoms and/or alkoxy radicals attached to the silicon of the organosilicon compound to the total alcoholic hydroxyl radicals is from .25:1 to .80:1. Drying oil acid is present in amount such that there is at least one carboxyl radical for each alcoholic hydroxyl in excess of the number of said halogen atoms and/or alkoxy radicals. This reaction is best carried out at temperatures of 75–200° C. During heating, the halogen and/or alkoxy radicals attached to the silicon atoms of the organosilicon compound react with the alcoholic hydroxyl groups with elimination of an alcohol and/or a halogen acid. The resulting product is an organosilicon ester of the alcohol and contains unreacted hydroxyl radicals. This organosilicon ester of the alcohol is reacted with the drying oil acid at temperatures of from 150° C. to 200° C. The reaction product of the organosilicon ester of the alcohol and the drying oil acid is then mixed with an oil soluble, phenol-formaldehyde resin. The mixture is heated, preferably in the range of from 125° C. to 300° C. until the desired viscosity is obtained. It is not known whether there is any actual chemical reaction between the phenolic resin and the other ingredients.

The preferred method of preparation when the organosilicon compound is a hydrolyzate, i. e., X is OH, is to react the drying oil and the phenolic resin with heating to 150° C. to 225° C. until the desired viscosity is obtained. The organosilicon hydrolyzate is then added to the above reaction product and heated to 150° C. to 250° C. until the desired viscosity is obtained.

The compositions of this invention make excellent varnishes which retain their gloss for long periods of time when exposed to drastic weather conditions. In general, the weatherability of the compositions of this invention exceeds that of presently available commercial organic varnishes. The compositions of this invention may also be formulated into paints by incorporating pigments therein. The instant compositions are particularly useful as outdoor coating compositions for wood and metal.

The following examples are illustrative only and are not to be construed as limiting the invention which is properly delineated in the appended claims.

Example 1

515 g. of an organosiloxane having the composition 67 mol per cent phenylmethylsiloxane, and 33 mol per cent monophenylsiloxane, and containing 12 per cent by weight silicon bonded methoxy groups, were mixed with 92 g. of glycerine and heated at a temperature from 130° C. to 200° C. until about 80 per cent of the theoretical amount of methanol was removed. 282 g. of linseed oil acid were then added and the mixture heated slowly to 200° C. with the removal of water. 389 g. of the resulting product were mixed with 50 g. of an oil soluble, nonheat-reactive, phenolformaldehyde resin and the mixture was heated at 150–240° C. until the cooled resin was tack free.

The resulting varnish was diluted with mineral spirits and applied to a wooden panel. After 1,000 hours in a weatherometer wherein the panel was exposed alternately to ultraviolet radiation and to a water spray at 140° F., the varnish finish was not crazed and showed no signs of chalking. A sample of this varnish showed excellent stability when exposed to the sun and ocean spray on the Texas coast.

Example 2

172 g. of the siloxane-glycerine-linseed oil acid product of Example 1 were mixed with 200 g. of an oil soluble p-butylphenol-formaldehyde resin, and with 344 g. of alkali refined linseed oil. The resulting mixture was heated at 290–292° C. for 5 hours and then dissolved in mineral spirits. The resulting product was an excellent coating composition for wood.

Example 3

344 g. of the siloxane-glycerine-linseed oil acid product of Example 1 were mixed with 162 g. of linseed oil and 200 g. of an oil soluble p-butylphenol-formaldehyde resin. The resulting mixture was heated one hour at 292° C. then cooled rapidly and diluted with mineral spirits. The resulting material was a satisfactory varnish.

Example 4

560 g. of linseed oil acid were reacted with 183 g. of pentaerythritol at a temperature of 230° C. for one hour. 1030 g. of the polysiloxane of Example 1 were then added to the product. This mixture was agitated and heated over a 4-hour period at a temperature sufficient to remove 113 g. of volatiles.

516 g. of the above product were mixed with 200 g. of an oil soluble p-phenylphenol-formaldehyde resin and the mixture was heated up to 270° C. over a period of 1.5 hours. The resulting product was a good varnish.

Example 5

184 g. of glycerine and 732 g. of diphenylsiloxane containing 17 per cent by weight silicon bonded methoxy radicals were mixed and heated at 200° C. until 133 g. of volatiles were removed. 560 g. of linseed oil acid were added and the mixture heated up to 208° C. over a period of 2.5 hours.

344 g. of the above product were mixed with 200 g. of an oil soluble p-butylphenol-formaldehyde resin and 172 g. of linseed oil. The mixture was heated up to 300° C. over a period of 1 hour and then diluted with mineral spirits. The resulting material was a satisfactory varnish.

Example 6

253 g. of diphenyldichlorosilane were mixed with 92 g. of anhydrous glycerine and benzene in amount of 35 per cent by weight of the chlorosilane. The mixture was heated slowly up to 90° C. over a period of 4.75 hours as HCl was evolved. Heating was continued at a temperature from 90 to 192° C. for 2 hours to remove solvent. 280 g. of linseed oil acid were then added to the above product and the mixture was heated at about 200° C. until the system was homogeneous.

344 g. of the resulting product were mixed with 172 g. of linseed oil and with 200 g. of an oil soluble p-butylphenol-formaldehyde resin and the mixture was heated at 240 to 270° C. until a satisfactory viscosity was obtained. The resulting product is useful as a varnish.

Example 7

Equivalent results are obtained when chlorophenolethyldichlorosilane is employed in the process of Example 6.

Example 8

Equivalent results are obtained when trimethylolethane is employed in place of the anhydrous glycerine in the process of Example 6.

Example 9

A mixture of 58.5 parts by weight Argentina tung oil and 31.5 parts by weight of a nonheat-reactive, oil soluble phenol-formaldehyde resin, available commercially as Bakelite BR 9400, was placed in a flask. The flask was swept with nitrogen and then heated with concurrent stirring. The reaction temperature was raised to 200° C. in thirty minutes and to 225° C. in the following 30 minutes, and was maintained at 225° C. for the following one hour. The reaction mixture was then cooled and added to 10 parts by weight of an organosilicon compound having the composition 55 mol per cent phenylmethylsiloxane, 30 mol per cent monomethylsiloxane, and 15 mol per cent monophenylsiloxane and having 1.5 per cent by weight of silicon bonded hydroxyl radicals. This mixture was swept with nitrogen and heated to 175–210° C. with concurrent agitation until the desired viscosity was obtained. This mixture was diluted to 60 per cent solids in solution by adding naphthol mineral spirits. The viscosity of this solution was 1810 cps. at 25° C. The resulting material was a good varnish.

*Example 10*

Following the method of Example 9, 48.8 parts by weight of Argentina tung oil, 26.2 parts by weight of the phenol-formaldehyde resin employed in Example 9, and 25 parts by weight of the organosilicon employed in Example 9 were used to prepare an excellent varnish having a viscosity of 3400 cps. at 25° C. with 60 per cent solids in naphthol mineral spirits. The resulting material was a good varnish.

*Example 11*

A composition comprising 39 parts by weight Argentina tung oil, 21 parts by weight of an oil soluble phenol-formaldehyde resin (Bakelite BR 9400) and 40 parts by weight of the organosilicon compound of Example 9 was prepared following the method of Example 9. This reaction product was diluted to 60 per cent solids with naphthol mineral spirits and was found to have a viscosity of 1012 cps. at a temperature of 25° C. This material was a good varnish.

That which is claimed is:

1. A composition of matter comprising the reaction product of (1) 5 to 90 per cent by weight of an organosilicon compound of the formula $$R_n SiX_m O_{\frac{4-m-n}{2}}$$

where R is selected from the group consisting of monovalent hydrocarbon radicals and halogenated monovalent hydrocarbon radicals, X is selected from the group consisting of halogen atoms, alkoxy radicals and hydroxyl radicals and $n$ has an average value of from 1 to 2 inclusive, $m$ has an average value of from .05 to 3 inclusive, $m+n$ being not greater than 4; (2) 5 to 90 per cent by weight of a combination of a polyhydroxy alcohol having 3 to 4 inclusive hydroxy groups per molecule and a drying oil acid in such proportion that the ratio of acid carboxyl radicals to the total alcoholic hydroxyl radicals is in the range of .2:1 to 1:1 inclusive; and (3) 5 to 60 per cent by weight of a drying oil soluble phenol-formaldehyde resin.

2. The composition in accordance with claim 1 wherein R is phenyl.

3. A composition in accordance with claim 1 wherein the organosilicon compound is a methylphenylorganosilicon compound.

4. A composition in accordance with claim 1 wherein X is hydroxyl.

References Cited in the file of this patent

UNITED STATES PATENTS 2,587,295   Doyle et al. _____ Feb. 26, 1952